(12) United States Patent
Wu et al.

(10) Patent No.: US 11,365,311 B2
(45) Date of Patent: Jun. 21, 2022

(54) FLEXIBLE TRANSPARENT MATERIAL

(71) Applicant: INDUSTRIAL TECHNOLOGY RESEARCH INSTITUTE, Hsinchu (TW)

(72) Inventors: Jin-An Wu, Huwei Township (TW); Bing-Jyun Zeng, Zhubei (TW); Fan-Jie Lin, New Taipei (TW); Fu-Ming Chien, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 299 days.

(21) Appl. No.: 16/731,751

(22) Filed: Dec. 31, 2019

(65) Prior Publication Data

US 2021/0198461 A1 Jul. 1, 2021

(51) Int. Cl.
*C08L 23/12* (2006.01)
*C08L 23/16* (2006.01)
*C08L 23/22* (2006.01)

(52) U.S. Cl.
CPC .............. *C08L 23/12* (2013.01); *C08L 23/16* (2013.01); *C08L 23/22* (2013.01); *C08L 2201/10* (2013.01); *C08L 2205/14* (2013.01); *C08L 2205/22* (2013.01); *C08L 2312/00* (2013.01)

(58) Field of Classification Search
None
See application file for complete search history.

(56) References Cited

U.S. PATENT DOCUMENTS

| 4,176,240 | A | * | 11/1979 | Sabia | C08L 53/025 |
| | | | | | 174/23 C |
| 5,994,450 | A | * | 11/1999 | Pearce | A43B 13/04 |
| | | | | | 524/505 |
| 6,147,160 | A | | 11/2000 | Wang et al. | |
| 6,277,916 | B1 | * | 8/2001 | Terbrueggen | C08F 8/34 |
| | | | | | 525/95 |
| 10,240,008 | B2 | | 3/2019 | Chung et al. | |
| 2006/0199910 | A1 | * | 9/2006 | Walton | C08L 2666/02 |
| | | | | | 525/192 |
| 2007/0093605 | A1 | * | 4/2007 | Adur | C08K 5/0083 |
| | | | | | 525/242 |

(Continued)

FOREIGN PATENT DOCUMENTS

CN 1362977 A 8/2002
CN 1832992 A 9/2008

(Continued)

OTHER PUBLICATIONS

Polymer Properties Database, Polyolefins (Polyalkene), pp. 1-4, 2021 (Year: 2021).*

*Primary Examiner* — Peter A Salamon
(74) *Attorney, Agent, or Firm* — Birch, Stewart, Kolasch & Birch, LLP

(57) ABSTRACT

A flexible transparent material is provided. The flexible transparent material includes a thermoplastic and a plurality of micelles dispersed in the thermoplastic. Each micelle includes a plurality of cross-linked rubber particles and a swelling liquid. The weight ratio of the thermoplastic to the total weight of the cross-linked rubber particles is from 1:5 to 4:5. The weight ratio of the swelling liquid to the total weight of the cross-linked rubber particles is from 1:5 to 2:1.

18 Claims, 2 Drawing Sheets

(56) References Cited

U.S. PATENT DOCUMENTS

| | | | | |
|---|---|---|---|---|
| 2018/0030219 A1* | 2/2018 | Chung | .................. | B29C 48/405 |
| 2018/0051139 A1* | 2/2018 | Bailey | .................. | C08G 81/025 |
| 2021/0198461 A1* | 7/2021 | Wu | .......................... | C08L 23/16 |

FOREIGN PATENT DOCUMENTS

| | | | |
|---|---|---|---|
| CN | 101486818 | A | 7/2009 |
| CN | 101356206 | B | 7/2012 |
| CN | 107429019 | A | 12/2017 |
| TW | I429706 | B | 3/2014 |
| TW | I579381 | B | 4/2017 |

* cited by examiner

FLEXIBLE TRANSPARENT MATERIAL

TECHNICAL FIELD

The disclosure relates to a flexible transparent material.

BACKGROUND

Thermoplastic vulcanizates (TPV) is a polymer composition, which includes a thermoplastic matrix with thermosetting elastomer distributed therebetween. Unlike a conventional thermoplastic elastomer (TPE), TPV has thermoplastic properties at high temperatures, is compressible at normal temperatures, and demonstrates resistance to permanent deformation. As such, TPV can be used in several fields, including the automotive industry, consumer electronics, packaging materials, and encapsulation.

In addition, TPV has gradually been applied in the biomedical field to prepare soft, highly transparent products (such as drip bags, drip tubes, and so on). However, efforts to maintain the mechanical strength and deformation resistance of conventional TPV (such as ethylene propylene diene monomer (EPDM)/polypropylene (PP) elastomer) make it difficult to achieve a high transparency in the final product.

Although there have been many studies, and the products have been made in this field under long-term development, there still remain many problems with processing, as well as with the various properties of said products. Therefore, there have been calls for improvements to be made in this industry.

SUMMARY

The disclosure provides a flexible transparent material. According to embodiments, the flexible transparent material includes a thermoplastic and a plurality of micelles dispersed in the thermoplastic. Each of the micelles is composed of a plurality of cross-linked rubber particles and a swelling liquid, wherein the thermoplastic and the cross-linked rubber particles have a weight ratio of 1:5 to 4:5, and the swelling liquid and the cross-linked rubber particles have a weight ratio of 1:5 to 2:1.

A detailed description is given in the following embodiments with reference to the accompanying drawings.

DETAILED DESCRIPTION

The flexible transparent material of the disclosure is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments.

According to embodiments of the disclosure, the disclosure provides a flexible transparent material. The flexible transparent material includes a thermoplastic and a plurality of micelles dispersed in the thermoplastic. Each of the micelles is composed of a plurality of cross-linked rubber particles and a swelling liquid. Using the swelling liquid of a specific ratio may lower the degree of the molecular chain entanglements in the cross-linked rubber, so that the cross-linked rubber can exist as nanoparticles in the micelles. As such, the cross-linked rubber particles are aggregated to form an agglomerate and the cross-linked rubber particles are filled with the swelling liquid to lower the crystallinity of the material and enhance light transmittance. Moreover, even if the cross-linked rubber particles are at nanoscale, the cross-linked rubber particles may still aggregate through $\pi$-$\pi$ interactions between benzene rings and adsorb the swelling liquid to form the micelles, because the cross-linked rubber is cross-linked vinyl aromatic rubber. Accordingly, the flexible transparent material of the disclosure includes not only the advantages of TPV (such as compressibility, resistance to permanent deformation, and thermal stability), but also a high degree of light transmittance, flexibility, and slip resistance. Therefore, the flexible transparent material can be injected or extruded to obtain a product for use in medical applications, high-end sporting goods, engineering seismic control, and other fields.

Figure 1:
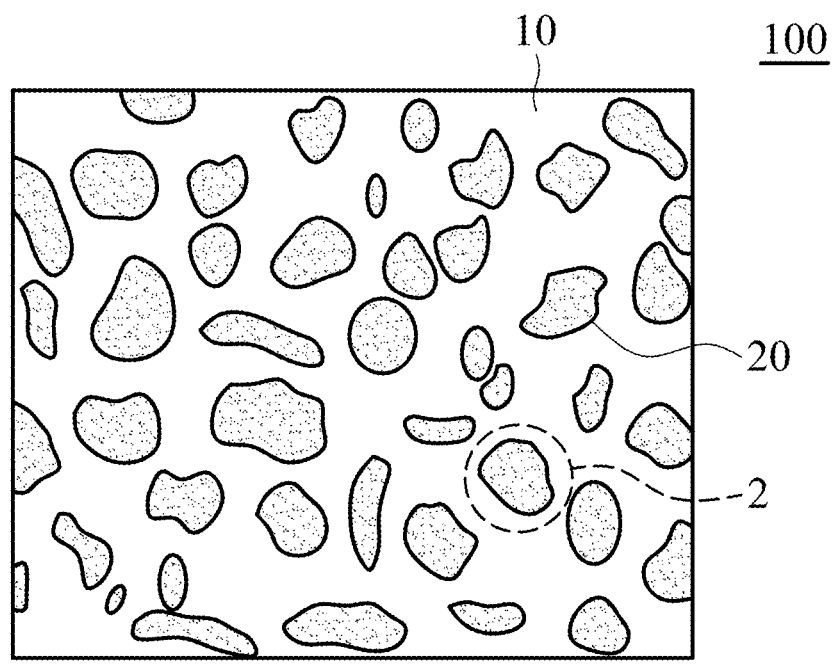
FIG. 1 shows a micro-structural diagram of the flexible transparent material in the disclosure.

To make the disclosure more clear and understandable, it will first be described in overview with specific examples. FIG. 1 shows a micro-structural diagram of the flexible transparent material 100 in the disclosure. As shown in FIG. 1, the flexible transparent material 100 may include a continuous phase 10 (composed of a thermoplastic) and a dispersed phase composed of a plurality of micelles 20, wherein the micelles 20 are dispersed in the thermoplastic. According to embodiments of the disclosure, the micelles 20 may have a diameter of about 200 nm to 3 μm, such as 300 nm to 3 μm, 400 nm to 3 μm, 500 nm to 3 μm, 200 nm to 2.8 μm, or 200 nm to 2.5 μm. According to embodiments of the disclosure, if the size of the micelles in the thermoplastic is not properly reduced to within the range provided in the disclosure, the material that is obtained will have poor tensile strength, elongation, compression deformation rate, and light transmittance. By utilizing the cross-linked vinyl aromatic rubber and the specific ratio of the swelling liquid, relatively small (compared to the conventional TPV dispersed phase) micelles are formed and are evenly dispersed in the thermoplastic when the thermoplastic and the rubber are mechanically blended (in which the rubber is cross-linked). According to embodiments, the flexible transparent material can be composed of thermoplastic and a plurality of micelles. The micelles are dispersed in the thermoplastic, and each of the micelles is composed of a plurality of cross-linked rubber particles and a swelling liquid.

Figure 2:
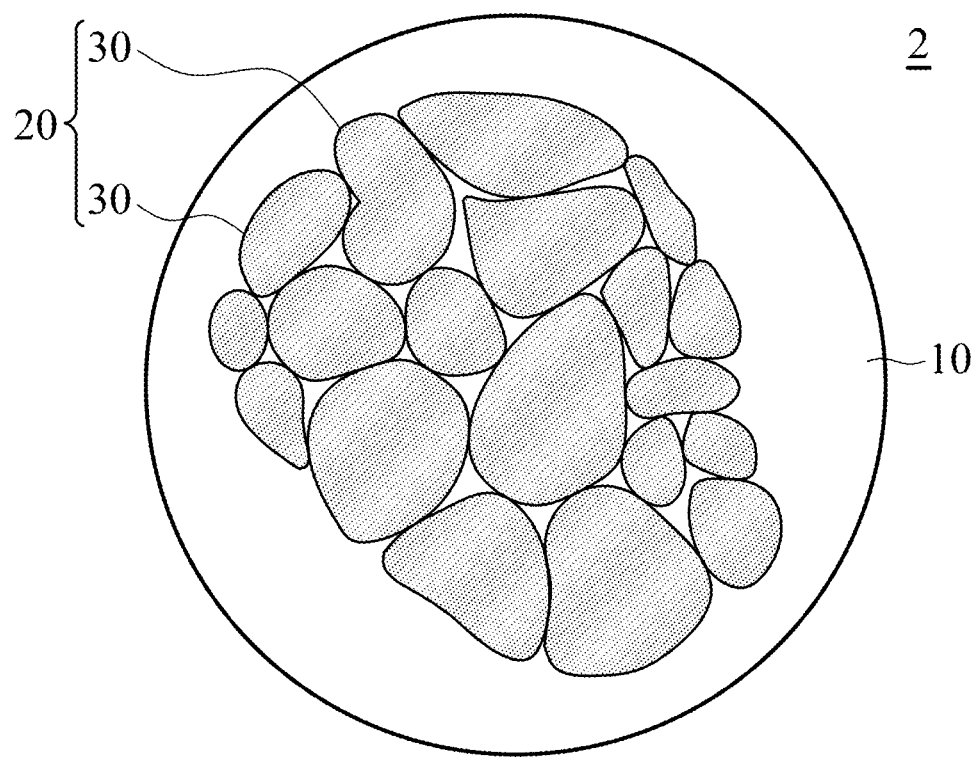
FIG. 2 shows an enlarged diagram of region 2 of the flexible transparent material in FIG. 1 of the disclosure.

FIG. 2 shows an enlarged diagram of region 2 of the flexible transparent material 100 in FIG. 1 of the disclosure. As shown in FIG. 2, the micelles 20 are composed of a plurality of cross-linked rubber particles 30 and a swelling liquid 30. Since the cross-linked rubber in the flexible transparent material of the disclosure has relatively low degree of molecular chain entanglement, the cross-linked rubber may be present as nanoparticles in the micelles. For example, the cross-linked rubber particles 30 may have a diameter of about 20 nm to 500 nm (such as about 20 nm to 450 nm, 20 nm to 400 nm, 30 nm to 500 nm, 40 nm to 500 nm, or 25 nm to 480 nm). Since the cross-linked rubber particles are cross-linked vinyl aromatic rubber particles, due to the π-π interactions between the benzene rings, the plurality of cross-linked rubber particles 30 may be aggregated to, for example, form a agglomerate and may further absorb the swelling liquid to form the micelles 20. The swelling liquid is within the cross-linked rubber particles 30. According to embodiments of the disclosure, the swelling liquid and the cross-linked rubber particles may have a weight ratio of about 1:5 to 2:1 (e.g. 1:4, 1:3, 1:2, 2:3, 3:4, 4:5, or 1:1). Here, the total weight of the cross-linked rubber particles refers to the weight of all of the cross-linked rubber particles in the flexible transparent material 100, excluding the weight of the swelling liquid. Due to the specific ratio of the swelling liquid, the degree of the molecular chain entanglement can be reduced while the thermoplastic is mechanically blended with the rubber (in which the rubber undergoes a cross-linking reaction), thereby improving the breaking degree of the cross-linked rubber by shear force. As such, the cross-linked rubber may form smaller cross-linked rubber particles (compared to the cross-linked rubber which constitutes the conventional TPV disperse phase). If the content of the swelling liquid is too low, the light transmittance of the obtained material that is obtained will would be affected reduced. If the content of the swelling liquid is too high, the mechanical strength, tensile strength, elongation, and compression deformation rate of the obtained material would become reduced. According to embodiments of the disclosure, the thermoplastic and the cross-linked rubber particles may have a weight ratio of about 1:5 to 4:5 (e.g. 1:4, 1:3, 1:2, 2:3, or 3:4). Here, the total weight of the cross-linked rubber particles refers to the weight of all of the cross-linked rubber particles in the flexible transparent material 100, excluding the weight of the swelling liquid. If the content of the cross-linked rubber particles is too low, the elongation, elasticity, and compression deformation rate of the obtained material would be reduced. If the content of the cross-linked rubber particles is too high, the mechanical strength of the obtained material would be reduced significantly.

According to embodiments of the disclosure, the film formed from the flexible transparent material of the disclosure has a light transmittance that is greater than or equal to 95% when the thickness of the film is equal to or less than 200 μm. The light transmittance of the film was measured according to the standard ASTM D1746.

According to embodiments of the disclosure, the thermoplastic can be polypropylene, polyethylene, polyurethane, poly(ethylene terephthalate), polyamide, or a combination thereof. According to embodiments of the disclosure, the thermoplastic may have a number average molecular weight of about 20,000 to 500,000, such as 20,000 to 500,000, 30,000 to 500,000, 40,000 to 500,000, 50,000 to 500,000, 20,000 to 400,000, 20,000 to 300,000, or 20,000 to 200,000. According to embodiments of the disclosure, the thermoplastic used in the disclosure is not further modified to be reactive. In other words, the thermoplastic does not include a reactive functional group to prevent a competitive reaction of the thermoplastic with the rubber while the thermoplastic and the rubber are being mechanically blended. The competitive reaction may negatively influence the cross-linking density of the cross-linked rubber and the mechanical properties of the subsequent material. For example, the reactive functional group can be acrylate group, methacrylate group, glycidyl group, oxiranyl group, oxetanyl group, or (3,4-epoxycyclohexyl)methyl group. Accordingly, the thermoplastic does not include thermoplastic silane-based plastic or thermoplastic siloxane-based plastic. In other words, the thermoplastic of the disclosure is a polymer that is free of silane moiety or siloxane moiety.

According to embodiments, the swelling liquid can be naphthenic oil, paraffinic oil, aromatic oil, mineral oil, or a combination thereof. In the micelles, the swelling liquid is absorbed by the cross-linked rubber particles, and the nanoscale cross-linked rubber particles are aggregated to each other due to polarity to form the agglomerate in the thermoplastic. In addition, the cross-linked rubber particles have benzene rings and tangled molecular chains, which may absorb a certain amount of the swelling liquid through the π-π interaction between the benzene rings, thereby further improving the transparency of the composition material.

According to embodiments of the disclosure, the cross-linked rubber particles are cross-linked vinyl aromatic rubber. According to embodiments, the cross-linked rubber particles are product obtained through cross-linking a composition. According to embodiments, the composition includes the vinyl aromatic rubber and a cross-linker. According to embodiments, the cross-linker and the vinyl aromatic rubber may have a weight ratio of about 0.1:100 to 3:100, such as 0.3:100, 0.5:100, 1:100, or 2:100. In addition, the composition includes the vinyl aromatic rubber, the cross-linker, and a cross-linking auxiliary. The cross-linking auxiliary and the vinyl aromatic rubber may have a weight ratio of about 0.1:100 to 6:100, such as 0.3:100, 0.5:100, 1:100, 2:100, 3:100, 4:100, or 5:100. Moreover, the composition may further include the described swelling liquid.

According to embodiments of the disclosure, the composition is composed of the vinyl aromatic rubber and the cross-linker. According to embodiments of the disclosure, the composition is composed of the vinyl aromatic rubber, the cross-linker, and the cross-linking auxiliary. According to embodiments, the composition is composed of the vinyl aromatic rubber, the cross-linker, the cross-linking auxiliary, and the swelling liquid.

According to embodiments, the vinyl aromatic rubber includes a vinyl aromatic block polymerized from a vinyl aromatic monomer. According to embodiments of the disclosure, the vinyl aromatic rubber includes the vinyl aromatic block and a conjugated diene block polymerized from a conjugated diene monomer. According to embodiments of the disclosure, the monomer of the vinyl aromatic block can be styrene, methylstyrene, ethylstyrene, cyclohexylstyrene, vinyl biphenyl, 1-vinyl-5-hexyl naphthalene, vinyl naphthalene, vinyl anthracene, or a combination thereof. In other words, the vinyl aromatic block can be obtained from polymerizing the above monomer or any combination thereof. The monomer of the diene block can be 1,3-butadiene, 2,3-dimethyl-1,3-butadiene, 3-butyl-1,3-octadiene, isoprene, 1-methylbutadiene, 2-phenyl-1,3-butadiene, or a combination thereof. In other words, the diene block can be obtained from polymerizing the above monomer or any combination thereof.

According to embodiments of the disclosure, the flexible transparent material does not contain polyolefin rubber, cross-linked polyolefin rubber, or a combination thereof. According to some embodiments of the disclosure, the dispersed phase of the flexible transparent material in the disclosure does not contain the polyolefin, cross-linked polyolefin, or a combination thereof. In other words, the composition for forming the cross-linked rubber does not contain the polyolefin rubber, wherein the polyolefin rubber is polyisobutylene (PM) rubber, ethylene propylene rubber (EPR), ethylene-propylene-diene monomer (EPDM) rubber, or a combination thereof. When the vinyl aromatic rubber is replaced with the polyolefin rubber, the repeating unit constructing the polyolefin rubber does not contain a benzene ring group, so that the cross-linked rubber particles cannot absorb a large amount of the swelling liquid.

Therefore, the material that is obtained will be opaque (having a light transmittance of less than 80).

According to embodiments, the content of the vinyl aromatic block of the vinyl aromatic rubber can be about 20 wt % to 90 wt % on the basis of the vinyl aromatic rubber (e.g. 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, or 85 wt %) for the sufficient π-π interaction between the cross-linked rubber particles. If the content of the vinyl aromatic block is too low, the cross-linked rubber particles cannot be aggregated to each other to form the agglomerate, thereby lowering the light transmittance of the material that is obtained. According to embodiments, the vinyl aromatic rubber can be non-hydrogenated vinyl aromatic rubber. In addition, the vinyl aromatic rubber can be non-hydrogenated vinyl aromatic rubber, or vinyl aromatic rubber having a total hydrogenation ratio of less than or equal to 10 wt % according to embodiments of the disclosure. According to embodiments, the vinyl aromatic rubber can be styrene-ethylene-butylene-styrene (SEBS) rubber, styrene-butadiene-styrene (SBS) rubber, styrene-isoprene-styrene (SIS) rubber, styrene-ethylene-propylene-styrene (SEPS) rubber, styrene-isoprene/butadiene-styrene (SIBS) rubber, styrene-butadiene (SB) rubber, styrene-isoprene (SI) rubber, styrene-isoprene-styrene (SIS) rubber, styrene-ethylene-butylene (SEB) rubber, styrene-ethylene-propylene (SEP) rubber, or a combination thereof.

According to embodiments, the cross-linker can be peroxide, novolac resin, sulfur, sulfide, carbodiimide compound, aliphatic diamine, or a combination thereof. According to embodiments of the disclosure, the peroxide can be dicumyl peroxide (DCP), perbutyl peroxide (PBP), tert-butylperoxy 2-ethylhexyl carbonate, di-t-butyl peroxide, 2,5-dimethyl-2,5-di(tert-butylperoxy)hexane, 2,5-di(tert-butylperoxy)-2,5-dimethyl-3-hexyne, di(tert-butylperoxy-isopropyl)benzene, 1,1-di-(tert-butylperoxy)-3,3,5-trimethylcyclohexane, butyl 4,4-bis(tert-butyldioxy)valerate, benzoyl peroxide, meta-chloroperoxybenzoic acid, 2,4-dichlorobenzoyl peroxide, tert-Butyl peroxybenzoate, tert-butylperoxy isopropyl carbonate, diacetyl peroxide, lauroyl peroxide, tert-butyl isopropylphenyl peroxide, or a combination thereof. According to embodiments of the disclosure, the novolac resin can be formed through a condensation reaction of a phenol compound and an aldehyde compound, wherein the phenol compound can be 4-t-butylphenol, 4-t-octylphenol, 2-ethylphenol, 3-ethylphenol, 4-ethylphenol, o-cresol, m-cresol, p-cresol, 2,5-xylenol, 3,4-xylenol, 3,5-xylenol, 2,3,5-trimethylphenol, 3-methyl-6-t-butylphenol, 2-naphthol, 1,3-dehydroxynaphthalene, bisphenol-A, or a combination thereof, and the aldehyde compound can be formaldehyde, paraformaldehyde, acetoaldehyde, benzaldehyde, phenylaldehyde, or a combination thereof. According to embodiments of the disclosure, the sulfide can be tetrabenzylthiuram disulfide, dibenzothiazole disulfide, or a combination thereof. According to embodiments, the carbodiimide compound can be 1-ethyl-3-(3-dimethylaminopropyl)carbodiimide, N,N'-dicyclohexylcarbodiimide, or a combination thereof. According to embodiments of the disclosure, the aliphatic diamine can be hexane diamine, octane diamine, nonanediamine, decanediamine, 1,16-hexadecane diamine, 1,18-octadecane diamine, or a combination thereof.

According to embodiments, the cross-linking auxiliary can be triallyl cyanurate (TAC), triallyl isocyanurate (TAIC), triallylphosphate (TAP), triallyl borate (TAB), trimethallyl isocyanurate (TMAIC), trimethylolpropane triacrylate (TMPTA), trimethylolpropane trimethacrylate, or a combination thereof.

According to embodiments, the manufacture of the flexible transparent material includes the following steps. First, the thermoplastic, the vinyl aromatic rubber, and the swelling liquid are blended to form a blend, in which the rubber and the thermoplastic may have a weight ratio of about 1:5 to 4:5. Subsequently, the cross-linker (and the cross-linking auxiliary) and the swelling liquid (serving as solvent) were added, leading to cross-linking of the rubber in the blend and then to vulcanization (at a temperature of 200 to 260 and a rotating rate of 150 rpm to 400 rpm). The original continuous rubber phase may wrap the swelling liquid to form the micelles dispersed in the plastic phase (a process that is called phase inversion) by the shear interaction produced during cross-linking, thereby obtaining the TPV. After the TPV is dried (e.g. at a temperature of 80° C. to 100° C. for a period of 6 hours to 8 hours) and pelletized, a flexible transparent material is obtained. The "blending" in the disclosure refers to a process of evenly mixing the rubber or the plastic with the reagent (such as the cross-linker, the cross-linking auxiliary, or the swelling liquid) by a mechanical action (e.g. an extruder), and the blending step can be performed in a discontinuous manner or a batch-wise manner. According to embodiments of the disclosure, the swelling liquid (total amount) and the cross-linked rubber particles have a weight ratio of 1:5 to 2:1.

According to embodiments of the disclosure, manufacture of TPV can be obtained through a dynamic cross-linking process. The term "dynamic cross-linking" refers to a process in which the mixture and the cross-linker are kneaded to form cross-linking between the rubber while the rubber and the plastic in the mixture are being melt blended. The term "dynamic" refers to a shear force being exerted on the mixture in the cross-linking step. For a better melt blending of the rubber and the plastic, the temperature of the blending period can be adjusted so that it is between the melting point and the decomposition temperature of the plastic.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

25 parts by weight of polypropylene (PP, 9580 commercially available from LCY Chemical Co.), 100 parts by weight of styrene-ethylene-butylene-styrene (SEBS) rubber (Taipol 6014 commercially available from TSRC Co.), and 80 parts by weight of mineral oil (FOMI-250, commercially available from CHOU FENG ENTERPRISE Co., Ltd.) were added into extruder JKM-DK10 (L/D=60) to perform melt blending at a temperature of 200° C. and a rate of screw rotation of 300 rpm. After blending for 1 minute, 1.5 parts by weight of cross-linker DCP (Commercially available from Keeneyes Industrial Co.) and 1.0 part by weight of cross-linking auxiliary (DOUBLEMER TMPTMA, commercially available from DOUBLE BOND CHEMICAL IND. CO., LTD.) were added into the extruder to perform melt blending at a temperature of 200° C. and a rate of screw rotation of 300 rpm. After blending for 3 minutes, the blend was pelletized by pelletizer (GAML-110L-150) to obtain a flexible transparent material (1). Subsequently, the diameter of the micelles, the diameter of the cross-linked rubber, cross-linking degree, surface hardness, tensile strength, elongation, compression deformation rate, and light transmittance of the flexible transparent material (1) were measured, and the results are shown in Table 1. The diameter of the micelles and the diameter of the cross-linked rubber were measured by TEM. The cross-linking degree was measured according to the standard ASTM D6204. The surface hardness was measured according to the standard ASTM D2240. The tensile strength was measured according to the standard ASTM D412. The elongation was measured according to the standard ASTM D412. The compression deformation rate was measured according to the standard ASMT D1349-99. The light transmittance was measured according to the standard ASTM D1746 (with a sample thickness of 200 μm).

Figure 3:
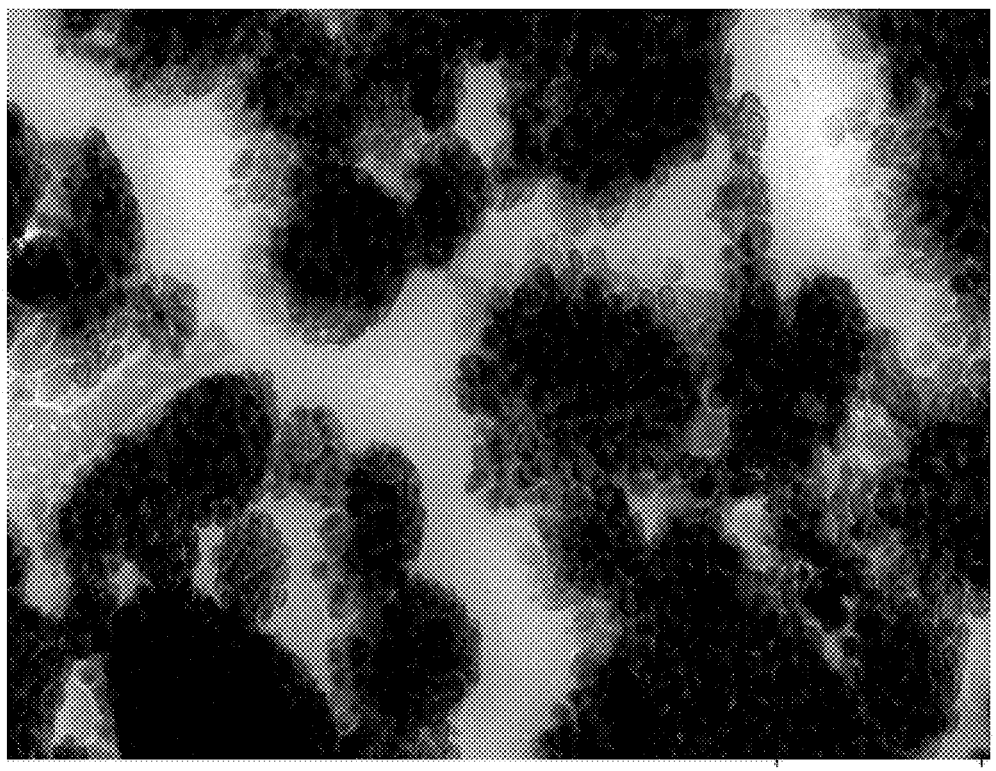
FIG. 3 shows a transmission electron microscope (TEM) image of the flexible transparent material (1).

The flexible transparent material (1) was investigated by transmission electron microscope (TEM), and the observation result is shown in FIG. 3. As shown in FIG. 3, the flexible transparent material (1) that was obtained included the micelles composed of a plurality of nanoscale cross-linked rubber particles and swelling liquid.

Example 2

Example 2 was similar to Example 1, and the difference in Example 2 was the polypropylene (PP) being increased from 25 parts by weight to 42.8 parts by weight to obtain a flexible transparent material (2). Subsequently, the diameter of the micelles, the diameter of the cross-linked rubber, cross-linking degree, surface hardness, tensile strength, elongation, compression deformation rate, and light transmittance of the flexible transparent material (2) were measured, and the results are shown in Table 1.

Example 3

Example 3 was similar to Example 1, and the difference in Example 3 was the polypropylene (PP) being increased from 25 parts by weight to 66.6 parts by weight to obtain a flexible transparent material (3). Subsequently, the diameter of the micelles, the diameter of the cross-linked rubber, cross-linking degree, surface hardness, tensile strength, elongation, compression deformation rate, and light transmittance of the flexible transparent material (3) were measured, and the results are shown in Table 1.

Comparative Example 1

Comparative Example 1 was similar to Example 1, and the difference in Comparative Example 1 was the cross-liner and the cross-linking auxiliary being omitted to obtain material (1). Subsequently, the diameter of the micelles, the diameter of the cross-linked rubber, cross-linking degree, surface hardness, tensile strength, elongation, compression deformation rate, and light transmittance of the material (1) were measured, and the results are shown in Table 1.

Comparative Example 2

Comparative Example 2 was similar to Example 1, and the difference in Comparative Example 2 was the polypropylene (PP) being decreased from 25 parts by weight to 10 parts by weight to obtain material (2). Subsequently, the diameter of the micelles, the diameter of the cross-linked rubber, cross-linking degree, surface hardness, tensile strength, elongation, compression deformation rate, and light transmittance of the material (2) were measured, and the results are shown in Table 1.

Comparative Example 3

Comparative Example 3 was similar to Example 1, and the difference in Comparative Example 3 was the polypropylene (PP) being increased from 25 parts by weight to 100 parts by weight to obtain material (3). Subsequently, the diameter of the micelles, the diameter of the cross-linked rubber, cross-linking degree, surface hardness, tensile strength, elongation, compression deformation rate, and light transmittance of the material (3) were measured, and the results are shown in Table 1.

TABLE 1

| | Example 1 | Example 2 | Example 3 | Comparative Example 1 | Comparative Example 2 | Comparative Example 3 |
|---|---|---|---|---|---|---|
| PP:SEBS (weight ratio) | 25:100 | 42.8:100 | 66.6:100 | 25:100 | 10:100 | 100:100 |
| Mineral oil:SEBS (weight ratio) | 80:100 | 80:100 | 80:100 | 80:100 | 80:100 | 80:100 |
| Cross-linker:SEBS | 1:100 | 1:100 | 1:100 | — | 1:100 | 1:100 |
| Cross-linking auxiliary:SEBS | 1.5:100 | 1.5:100 | 1.5:100 | — | 1.5:100 | 1.5:100 |
| Diameter of cross-linked rubber particles | 20-48 nm | 18-42 nm | 25-44 nm | No cross-linked particle | 90-320 nm | 84-254 nm |
| Diameter of micelles | 0.5~1.2 μm | 0.7~2.2 μm | 0.8~2.8 μm | No micelle | 1.0~12.1 μm | 1.2~5.8 μm |
| Cross-linking degree | $2.5 \times 10^{-5}$ mol/cm$^3$ | $4.7 \times 10^{-5}$ mol/cm$^3$ | $6.5 \times 10^{-5}$ mol/cm$^3$ | Zero | $5.6 \times 10^{-6}$ mol/cm$^3$ | $8.5 \times 10^{-6}$ mol/cm$^3$ |
| Surface hardness (Shore A) | 53 | 60 | 71 | 46 | 32 | 80 |
| Tensile strength (Kg/cm$^2$) | 58.1 | 86.4 | 101.2 | 23 | 28.9 | 129.5 |
| Elongation (%) | 525 | 709 | 687 | 757 | 427 | 228 |

TABLE 1-continued

|  | Example 1 | Example 2 | Example 3 | Comparative Example 1 | Comparative Example 2 | Comparative Example 3 |
| --- | --- | --- | --- | --- | --- | --- |
| Compression deformation rate (70° C./22 hours) | 29.5 | 36.4 | 44.3 | 58.1 | 28.1 | 52.3 |
| Light transmittance (%) | 96.1 | 95.8 | 96.5 | 82.8 | 86.7 | 88.4 |

As shown in Table 1, when the cross-linked rubber and the thermoplastic had a ratio of about 1:5 to 4:5, the materials (e.g. the flexible transparent materials (1) to (3)) that were obtained had a high degree of light-transmittance and elongation, as well as good mechanical properties, and they had a low compression deformation rate. In addition, when the cross-linker and the cross-linking auxiliary were not added, the light transmittance, surface hardness, and tensile strength of the material that were obtained were noticeably lower, and its compression deformation rate was noticeably higher.

Comparative Example 4

Comparative Example 4 was similar to Example 3, and the difference in Comparative Example 4 was the mineral oil being decreased from 80 parts by weight to 0 part by weight to obtain material (4). Subsequently, the diameter of the micelles, the diameter of the cross-linked rubber, cross-linking degree, surface hardness, tensile strength, elongation, compression deformation rate, and light transmittance of the material (4) were measured, and the measurement results are shown in Table 2.

Comparative Example 5

Comparative Example 5 was similar to Example 3, and the difference in Comparative Example 5 was the mineral oil being decreased from 80 parts by weight to 25 parts by weight to obtain material (5). Subsequently, the diameter of the micelles, the diameter of the cross-linked rubber, cross-linking degree, surface hardness, tensile strength, elongation, compression deformation rate, and light transmittance of the material (5) were measured, and the measurement results are shown in Table 2.

Example 4

Example 4 was similar to Example 3, and the difference in Example 4 was the mineral oil being decreased from 80 parts by weight to 50 parts by weight to obtain a flexible transparent material (4). Subsequently, the diameter of the micelles, the diameter of the cross-linked rubber, cross-linking degree, surface hardness, tensile strength, elongation, compression deformation rate, and light transmittance of the flexible transparent material (4) were measured, and the measurement results are shown in Table 2.

Example 5

Example 5 was similar to Example 3, and the difference in Example 5 was the mineral oil being increased from 80 parts by weight to 200 parts by weight to obtain a flexible transparent material (5). Subsequently, the diameter of the micelles, the diameter of the cross-linked rubber, cross-linking degree, surface hardness, tensile strength, elongation, compression deformation rate, and light transmittance of the flexible transparent material (5) were measured, and the measurement results are shown in Table 2.

Comparative Example 6

Comparative Example 6 was similar to Example 4, and the difference in comparative Example 6 was the cross-liner and the cross-linking auxiliary being omitted to obtain material (6). Subsequently, the diameter of the micelles, the diameter of the cross-linked rubber, cross-linking degree, surface hardness, tensile strength, elongation, compression deformation rate, and light transmittance of the material (6) were measured, and the measurement results are shown in Table 2.

TABLE 2

|  | Comparative Example 4 | Comparative Example 5 | Comparative Example 6 | Example 4 | Example 3 | Example 5 |
| --- | --- | --- | --- | --- | --- | --- |
| PP:SEBS (weight ratio) | 66.6:100 | 66.6:100 | 66.6:100 | 66.6:100 | 66.6:100 | 66.6:100 |
| Mineral oil:SEBS (weight ratio) | 0:100 | 25:100 | 50:100 | 50:100 | 80:100 | 200:100 |
| Cross-linker:SEBS | 1.5:100 | 1.5:100 | — | 1.5:100 | 1.5:100 | 1.5:100 |
| Auxiliary:SEBS | 1:100 | 1:100 | — | 1:100 | 1:100 | 1:100 |
| Diameter of cross-linked rubber particles | 85–256 nm | 68–125 nm | No micelle | 30–52 nm | 25–44 nm | 32–48 nm |
| Diameter of micelles | 2.0~6.7 μm | 1.5~4.1 μm | No cross-linked particle | 0.8~2.2 μm | 0.8~2.8 μm | 0.7~2.3 μm |
| Cross-linking degree | 2.2E–5 mol/cm$^3$ | 2.6E–5 mol/cm$^3$ | Zero | 5.5E–5 mol/cm$^3$ | 6.5E–5 mol/cm$^3$ | 4.5E–5 mol/cm$^3$ |
| Surface area (Shore A) | 93 | 88 | 76 | 81 | 71 | 45 |

TABLE 2-continued

|  | Comparative Example 4 | Comparative Example 5 | Comparative Example 6 | Example 4 | Example 3 | Example 5 |
|---|---|---|---|---|---|---|
| Tensile strength (Kg/cm$^2$) | 135 | 122 | 89 | 115.9 | 101.2 | 45.2 |
| Elongation (%) | 458 | 512 | 859 | 499 | 687 | 723 |
| Compression deformation rate (70° C./22 hours) | 55.2 | 53.9 | 63.4 | 48.5 | 44.3 | 38.9 |
| Light transmittance (%) | 83.6 | 85.7 | 85.4 | 95.2 | 96.5 | 95.8 |

As shown in Table 2, when the swelling liquid and the cross-linked rubber particles had a weight ratio of less than 50:100, the light transmittance of the material that was obtained was noticeably lower. Moreover, when the swelling liquid and the cross-linked rubber particles had a weight ratio of 1:5 to 2:1, the materials (e.g. the flexible transparent materials (3) to (5)) that were obtained had a high light transmittance, better mechanical properties, a higher degree of elongation, and a low compression deformation rate. In addition, when the cross-linker and the cross-linking auxiliary were not added, the light transmittance, surface hardness, and tensile strength of the material that was obtained were all noticeably lower, and its compression deformation rate was noticeably higher.

Example 6

Example 6 was similar to Example 2, and the difference in Example 6 was the cross-linker being increased from 1.5 parts by weight to 3 parts by weight to obtain a flexible transparent material (6). Subsequently, the diameter of the micelles, the diameter of the cross-linked rubber, cross-linking degree, surface hardness, tensile strength, elongation, compression deformation rate, and light transmittance of the flexible transparent material (6) were measured, and the measurement results are shown in Table 3.

Example 7

Example 7 was similar to Example 2, and the difference in Example 7 was the mineral oil being decreased from 80 parts by weight to 50 parts by weight to obtain a flexible transparent material (7). Subsequently, the diameter of the micelles, the diameter of the cross-linked rubber, cross-linking degree, surface hardness, tensile strength, elongation, compression deformation rate, and light transmittance of the flexible transparent material (7) were measured, and the measurement results are shown in Table 3.

TABLE 3

|  | Example 6 | Example 7 |
|---|---|---|
| PP:SEBS (weight ratio) | 42.8:100 | 42.8:100 |
| Mineral oil:SEBS (weight ratio) | 80:100 | 50:100 |
| Cross-linker:SEBS | 3:100 | 1.5:100 |
| Cross-linking auxiliary:SEBS | 1:100 | 1:100 |
| Diameter of cross-linked rubber particles | 16–43 nm | 26–55 nm |
| Diameter of micelles | 0.9–2.5 μm | 0.7–2.8 μm |
| Cross-linking degree | 8.7E−5 mol/cm$^3$ | 5.2E−5 mol/cm$^3$ |

TABLE 3-continued

|  | Example 6 | Example 7 |
|---|---|---|
| Surface hardness (Shore A) | 62 | 68 |
| Tensile strength (Kg/cm$^2$) | 92.5 | 103.8 |
| Elongation (%) | 698 | 545 |
| Compression deformation rate (70° C./22 hours) | 35.8 | 39.6 |
| Light transmittance (%) | 95.1 | 96.2 |

As shown in Table 3, when the swelling liquid and the cross-linked rubber particles had a weight ratio of 1:5 to 2:1 and the thermoplastic and the cross-linked rubber particles had a weight ratio of 1:5 to 4:5, the materials (such as the flexible transparent materials (6) and (7)) that were obtained had high light transmittance, high mechanical properties, high elongation, and low compression deformation rate.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A flexible transparent material, comprising:
   a thermoplastic; and
   a plurality of micelles dispersed in the thermoplastic, wherein each of the micelles is composed of a plurality of cross-linked rubber particles and a swelling liquid, the weight ratio of the thermoplastic to the total weight of the cross-linked rubber particles is from 1:5 to 4:5, and the weight ratio of the swelling liquid to the total weight of the cross-linked rubber particles is from 1:5 to 2:1, wherein the cross-linked rubber particles have a diameter of 20 nm to 500 nm.

2. The flexible transparent material as claimed in claim 1, wherein the micelles have a diameter of 200 nm to 3 μm.

3. The flexible transparent material as claimed in claim 1, wherein the plastic is polypropylene, polyethylene, polyurethane, poly(ethylene terephthalate), polyamide, or a combination thereof.

4. The flexible transparent material as claimed in claim 1, wherein the cross-linked rubber particles adsorb the swelling liquid and are aggregated to form an agglomerate.

5. The flexible transparent material as claimed in claim 1, wherein the swelling liquid is naphthenic oil, paraffinic oil, aromatic oil, mineral oil, or a combination thereof.

6. The flexible transparent material as claimed in claim 1, wherein the cross-linked rubber particles are cross-linked vinyl aromatic rubber.

7. The flexible transparent material as claimed in claim 1, wherein the cross-linked rubber particles are a cross-linked product of a composition, and the composition includes a vinyl aromatic rubber and a cross-linker.

8. The flexible transparent material as claimed in claim 7, wherein the vinyl aromatic rubber comprises a vinyl aromatic block polymerized from a vinyl aromatic monomer.

9. The flexible transparent material as claimed in claim 8, wherein the content of the vinyl aromatic block is 20 wt % to 90 wt % on the basis of the vinyl aromatic rubber.

10. The flexible transparent material as claimed in claim 8, wherein the vinyl aromatic monomer is styrene, methylstyrene, ethylstyrene, cyclohexylstyrene, vinyl biphenyl, 1-vinyl-5-hexyl naphthalene, vinyl naphthalene, vinyl anthracene, or a combination thereof.

11. The flexible transparent material as claimed in claim 7, wherein the vinyl aromatic rubber is styrene-ethylene-butylene-styrene (SEBS) rubber, styrene-butadiene-styrene (SBS) rubber, styrene-isoprene-styrene (SIS) rubber, styrene-ethylene-propylene-styrene (SEPS) rubber, styrene-isoprene/butadiene-styrene (SIBS) rubber, styrene-butadiene (SB) rubber, styrene-isoprene (SI) rubber, styrene-ethylene-butylene (SEB) rubber, styrene-ethylene-propylene (SEP) rubber, or a combination thereof.

12. The flexible transparent material as claimed in claim 7, wherein the cross-linker is peroxide, novolac resin, sulfur, sulfide, carbodiimide compound, aliphatic diamine, or a combination thereof.

13. The flexible transparent material as claimed in claim 1, being free of polyolefin rubber, cross-linked polyolefin rubber, or a combination thereof.

14. The flexible transparent material as claimed in claim 13, wherein the polyolefin rubber is polyisobutylene (PIB) rubber, ethylene propylene rubber (EPR), ethylene-propylene-diene monomer (EPDM) rubber, or a combination thereof.

15. The flexible transparent material as claimed in claim 1, wherein the thermoplastic is free of a reactive functional group, and the reactive functional group is acrylate group, methacrylate group, glycidyl group, oxiranyl group, oxetanyl group, or (3,4-epoxycyclohexyl)methyl group.

16. The flexible transparent material as claimed in claim 7, wherein the composition further comprises a cross-linking auxiliary.

17. The flexible transparent material as claimed in claim 16, wherein the cross-linking auxiliary is triallyl cyanurate (TAC), triallyl isocyanurate (TAIC), triallylphosphate (TAP), triallyl borate (TAB), trimethallyl isocyanurate (TMAIC), trimethylolpropane triacrylate (TMPTA), trimethylolpropane trimethacrylate, or a combination thereof.

18. The flexible transparent material as claimed in claim 1, having a light transmittance that is greater than or equal to 95% when the thickness of the flexible transparent material is 200 μm.

\* \* \* \* \*